United States Patent [19]

McCombs, Jr.

[11] Patent Number: 4,517,796

[45] Date of Patent: May 21, 1985

[54] POWER LEVER APPARATUS FOR A TURBINE ENGINE

[75] Inventor: Howard L. McCombs, Jr., South Bend, Ind.

[73] Assignee: Allied Corporation, Morristown, N.J.

[21] Appl. No.: 500,728

[22] Filed: Jun. 3, 1983

[51] Int. Cl.³ .................................................. F02C 9/28
[52] U.S. Cl. .................................................. 60/39.281
[58] Field of Search ........................ 60/39.281, 39.141

[56] References Cited

U.S. PATENT DOCUMENTS

| 3,225,814 | 12/1965 | Capwell | 60/39.281 |
|---|---|---|---|
| 3,327,472 | 6/1967 | Peczkowski et al. | 60/39.281 |
| 3,332,234 | 7/1967 | Lavash | 60/39.281 |
| 4,142,364 | 3/1979 | Wanger | 60/39.281 |
| 4,245,462 | 1/1981 | McCombs | 60/39.281 |
| 4,302,931 | 12/1981 | White et al. | 60/39.281 |

Primary Examiner—Louis J. Casaregola

Attorney, Agent, or Firm—Leo H. McCormick, Jr.; Ken C. Decker

[57] ABSTRACT

In a turbine engine having a compressor with a bleed valve and a variable geometry apparatus is responsive to an operational control member for regulating the flow rate of fuel supplied the turbine engine as a function of atmospheric pressure and the temperature of air supplied to the compressor corresponding to movement of a power lever by an operator to a desired operation of the turbine engine. The power lever has an indicator member fluidically connected to a follower member linked to the operational control member. The fluidic connection is responsive to operational parameters of the turbine engine and limits the rotational input to the follower member when the rate of fuel flow could cause stalling and the development of an unacceptable operating temperature or overspeed condition in the turbine engine.

42 Claims, 7 Drawing Figures

POWER LEVER APPARATUS FOR A TURBINE ENGINE

BACKGROUND OF THE INVENTION

This invention relates to a power lever apparatus through which a control member schedules fuel to operate a turbine engine.

Controls for gas turbine engines should not require the operator to use special precautions in his movement or positioning of the power request input during engine operation. During primary control operation, several engine parameters such as speed, compressor pressure, air temperature, turbine temperature, etc. are normally sensed and used to compute the level and rate of change of fuel flow and variable geometry position so as to prevent engine overspeed and/or overtemperature, and avoid engine stall during acceleration/deceleration of engine speed. Such primary control system complexity is well understood by those familiar with this art, and is typical of the majority of gas turbine engine controls in use at the present time.

In many cases, such as a single engine aircraft, a backup control is required to operate the engine in the event of failure of the primary control system. To keep cost and weight to a minimum, it is desired that the backup control be as simple as possible, and the number of engine parameters sensed be minimal, such as air temperature and pressure. To maintain simplicity in current practice, the fuel flow and variable geometry are scheduled directly as a function of power lever input by the operator, which restricts the operator to the rate and position of the power lever during operation, such as disclosed in U.S. Pat. No. 4,245,462 McCombs, filed Nov. 29, 1978, where the input from an operator as applied to the power lever is directly transmitted to the operational fuel control. Each turbine engine must operate within an aircraft flight envelope without causing turbine overtemperature and/or engine overspeed. Due to the entire flight envelope, the maximum input is such that fuel flow may be unnecessarily restricted in certain areas of the flight enevelope. Thus, even though the power lever position is at maximum power, the gas generator may be operating at a thrust level below the capacity of the turbine engine. In situations wherein the turbine eingine is in an aircraft, for take-off it is important that the turbine engine operate at its maximum thrust capacity.

SUMMARY OF THE INVENTION

In the turbine engine, as disclosed herein, having a compressor with a bleed valve and a variable geometry apparatus responsive to an operational control member for regulating the flow rate of fuel supplied to the turbine engine, the power lever has an indicator member fluidically connected to a follower member operationally linked to the operational control. The fluidic connection has a piston responsive to a pressure differential created between a source of fluid at a first pressure and an operational fluid pressure developed by restricting the flow of fluid through an orifice. A first valve which receives the first operational fluid is connected to a switch. The switch receives an input signal representative of operational parameters of the turbine engine, i.e., temperature, pressure, mach number, etc. When the operational parmeters are outside of set limits, the first valve is opened to a return conduit. Therefore, if the indicator lever is moved to a maximum power condition, the first valve and switch limit the pressure differential development to levels where the fuel flow to the turbine will not produce an overspeed and/or an overtemperature condition. If the parameters are within set limits, the first valve remains closed to the return conduit. Thereafter, if the indicator lever is moved to maximum power, the operational pressure differential develops such that the follower is rotated to its maximum position and a maximum fuel flow is provided to the turbine engine.

An advantage this invention provides results from the protection afforded the turbine engine whereby fuel flow as requested by an operator through the positioning of an indicator is limited during certain operational conditions to prevent an overspeed condition and/or an overtemperature condition.

Another advantage of this invention is the removal of all motion and position restriction on the power lever during the operation of a turbine engine.

It is an object of this invention to provide an operational control for a turbine engine with a power lever having an indicator member fluidically connected to a follower member. The fluidic connection provides substantially identical movement between the indicator member and the follower member within set operating parmeters of the turbine engine but limits on the movement of the follower if the operating parameters are exceeded thereby maintaining the fuel flow to the turbine engine within a set operating range irrespective of the indicator position.

It is a further object of this invention to provide a power lever for a control member that controls the flow of fuel to a turbine engine with an indicator member and a follower member. The follower member is connected to the indicator member by a fluidic connection and the control member. If the flow of fuel to the turbine engine could cause an overspeed or an overtemperature condition, an operating signal activates a switch to modify the fluidic connection such that the fuel flow is limited to an acceptable level irrespective of the position of the indicator member.

A still further object of this invention is to provide means for obtaining near maximum power from a turbine engine operating with a backup fuel control during take-off and initial climb without causing engine overtemperature or overspeed in this and all other regions of the flight envelope.

A still further object of this invention is to provide means to limit the input to the control member to its idle limit position during starting regardless of the input provided to the power lever and once the turbine engine is started, to that fuel flow corresponding to the position of the power lever.

DETAILED DESCRIPTION OF THE INVENTION

Figure 1:
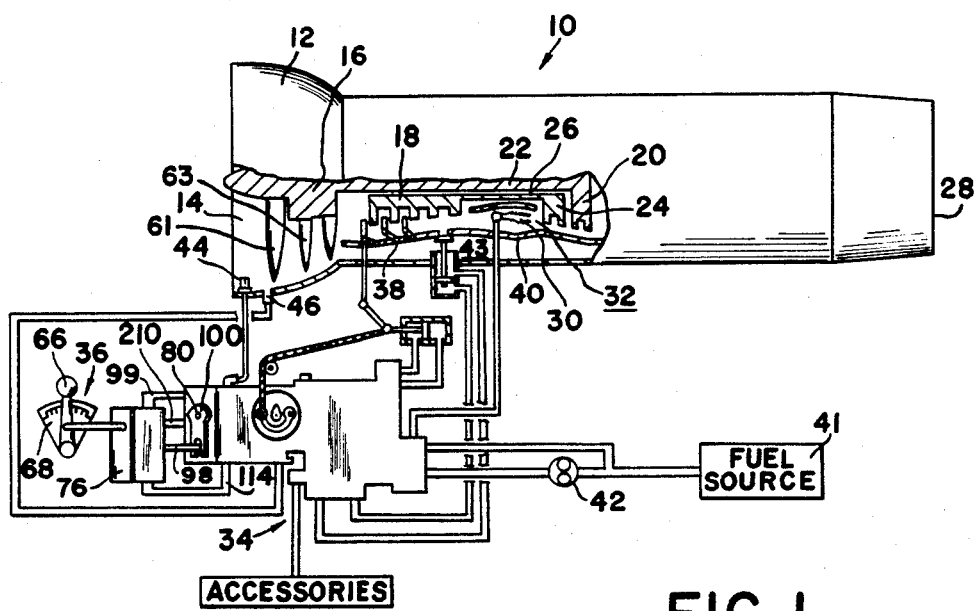
FIG. 1 is a schematic illustration of a turbine engine with a power lever made according to the principles of this invention.

The turbine engine 10 for use in an aircraft as shown in FIG. 1 has a housing 12 with an air inlet 14, a first stage air compressor 16, a second stage air compressor 18, a first turbine 20 connected by shaft 22 to the first stage compressor 16, a second turbine 24 connected by shaft 26 to the second stage compressor 18 and an exhaust nozzle 28. A plurality of fuel nozzles 30 which are located in a combustion chamber 32 receive fuel from a fuel control mechanism 34 of the type fully disclosed in U.S. Pat. No. 4,245,462 in response to an operator input to a power lever arrangement 36. The fuel in chamber 32 and the air supplied thereto by the first and second stage air compressors are combined in a fuel-air mixture and burned to generate a thrust as the products of combustion pass through exhaust nozzle 28.

The volume of air which is communicated to combustion chamber 32 is determined by the position of vanes 38 with respect to second stage compressor 18. Movement of vanes 38 creates a variable geometry flow path between shoud 40 and the second stage compressor 18. Any excess air from the first stage compressor 16 is communicated to the rear of housing 12 through flow ducts 43.

The fuel supplied to nozzle 30 is metered flow from a positive displacement pump 42 that is driven by the output of the turbine 24 in a manner well known in the field of turbine engines.

The fuel to air ratio determines the temperature of the hot gases entering the turbine from combustion chamber 32. If the fuel flow through nozzles 30 is increased, the temperature of the air passing through combustion chamber 32 is proportionally increased to supply added thermal and pneumatic energy to rotate turbines 20 and 24 while at the same time increasing the thrust of the exhausted gases through nozzle 28.

In order to obtain optimum thermal efficiency and maximum thrust, the turbine inlet temperature is maintained as close to the allowable limits as possible. Thus, a temperature probe 44 is located in inlet 14 to monitor the temperature of the air that is supplied to the first and second stage compressors 16 and 18. The output of the temperature probe 44 is transmitted to a fuel flow scheduling cam in the fuel control mechanism 34 of the type disclosed in U.S. Pat. No. 4,245,462.

To increase or accelerate the turbine speed or engine thrust, it is necessary to provide excess fuel flow above the amount required to run the engine at a fixed speed. However, because of the maneuver requirement of many aircraft, it is necessary that the speed increases as quickly as possible in response to the pilot's request. However, the rate at which the engine speed can safely be increased is limited by the following engine operational factors: (a) the maximum allowable turbine inlet temperature; and (b) compressor stall.

The maximum turbine inlet temperature at a steady state condition is limited by the fuel flow scheduling cam member. The temperature and/or overspeed limitation imposed on the operation of the turbine engine 10 by the schedule of fuel associated with the flight envelope does not provide for maximum power during take-off conditions such as sea level, standard day. The power lever arrangement 36 allows for an operator to schedule additional fuel to the turbine engine 10 during take-off to achieve maximum power without exceeding engine temperature limitations. In addition, the power lever arrangement 36 limits the rate of change of fuel flow and variable geometry position to avoid compressor stall of the engine during acceleration and deceleration. Compressor stall is a condition that is caused by several factors. One of these factors occurs when the compressor speed is accelerated too rapidly. As the speed of the compressor is increased, the weight flow of air through the first and second compressors 16 and 18 must also increase. However, there is a limit to the rate at which the airflow can be increased. The compressors 16 and 18 pump air by means of several blades 61 and 63 which are dependent on a smooth aerodynamic airflow around each blade in order to function properly. If the rotational speed of the compressor is accelerated faster than the airflow can accelerate, the smooth airflow is interrupted and turbulence occurs. This turbulence thereafter reduces the airflow to the combustion chamber 32 resulting in too great a volume of fuel in the combustion chamber.

The power lever arrangement 36 which is best shown in FIGS. 2–6 provides for automatic compensation of the input to the fuel control mechanism 34 whenever the scheduled fuel flow could cause an overtemperature or stall condition.

The power lever arrangement 36 maintains the schedule of fuel flow at idle condition during a starting sequence regardless of the position of the indicator lever 66 to assure that the requested fuel flow is correct.

Figure 2:
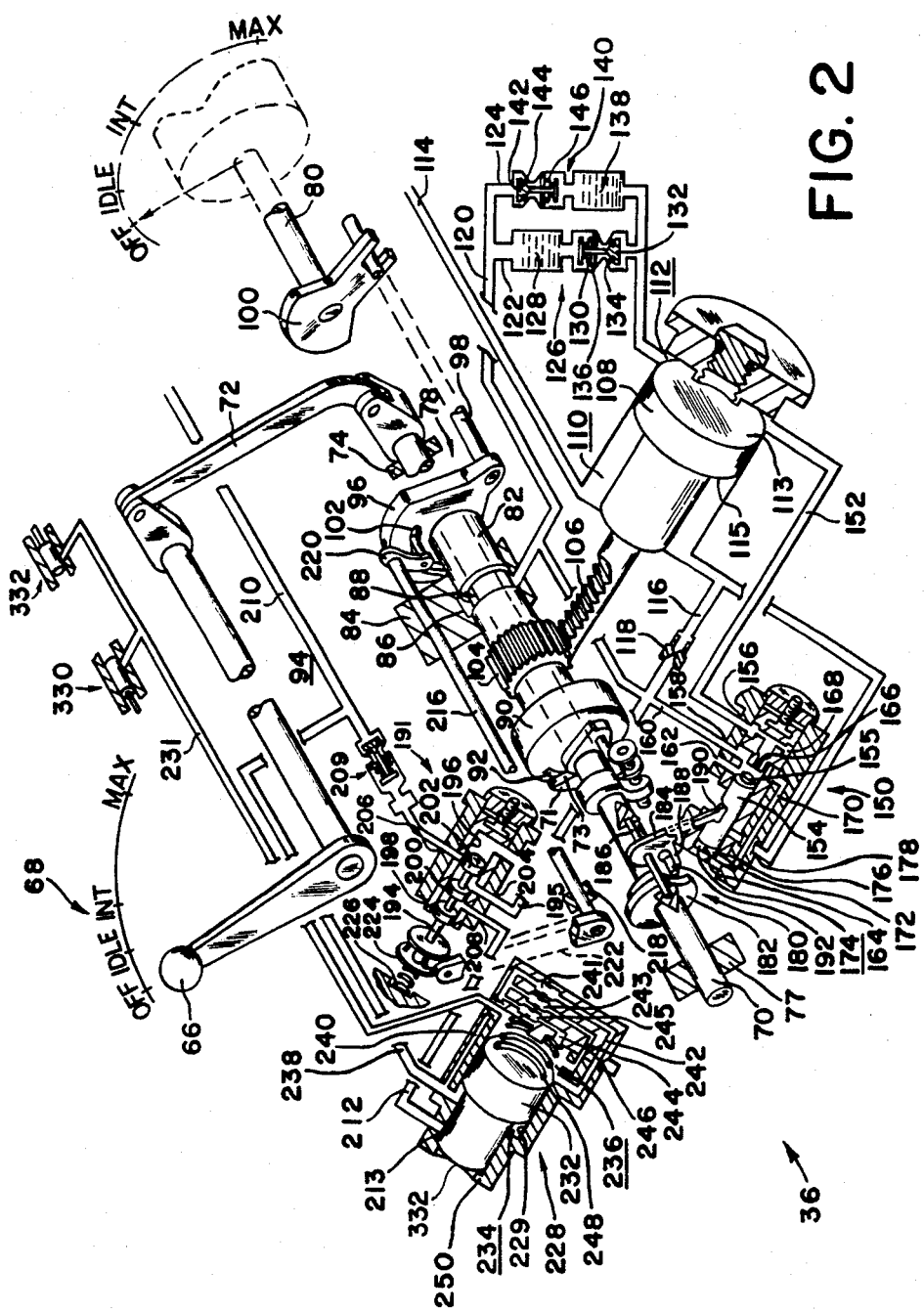
FIG. 2 is a schematic illustration with a partial sectional view of the power lever in an off position.

In more particular detail, the power lever arrangement 36 shown in FIG. 2 in the cut-off position includes an indicator lever 66 located over indicia 68 to provide an operator with a visual indication of a desired operation of the turbine engine.

The indicator lever 66 is connected to a shaft 70 by a link 72. Shaft 70 is positioned on bearings 74 and 77 of the housing 76 of the lever arrangement 36. Movement of indicator lever 66 imparts a corresponding rotary movement in shaft 70. However, shaft 70 is fluidically connected to a follower member 78 which is linked with the shaft 80 of the fuel control mechanism 34.

The follower mechanism 78 includes a sleeve 82 retained in bearing 84 in housing 76. Sleeve 82 which surrounds shaft 70 has a groove or slot 86 through which fluid is communicated into a passage 88 formed on inner surface of the sleeve 82.

Figure 4:
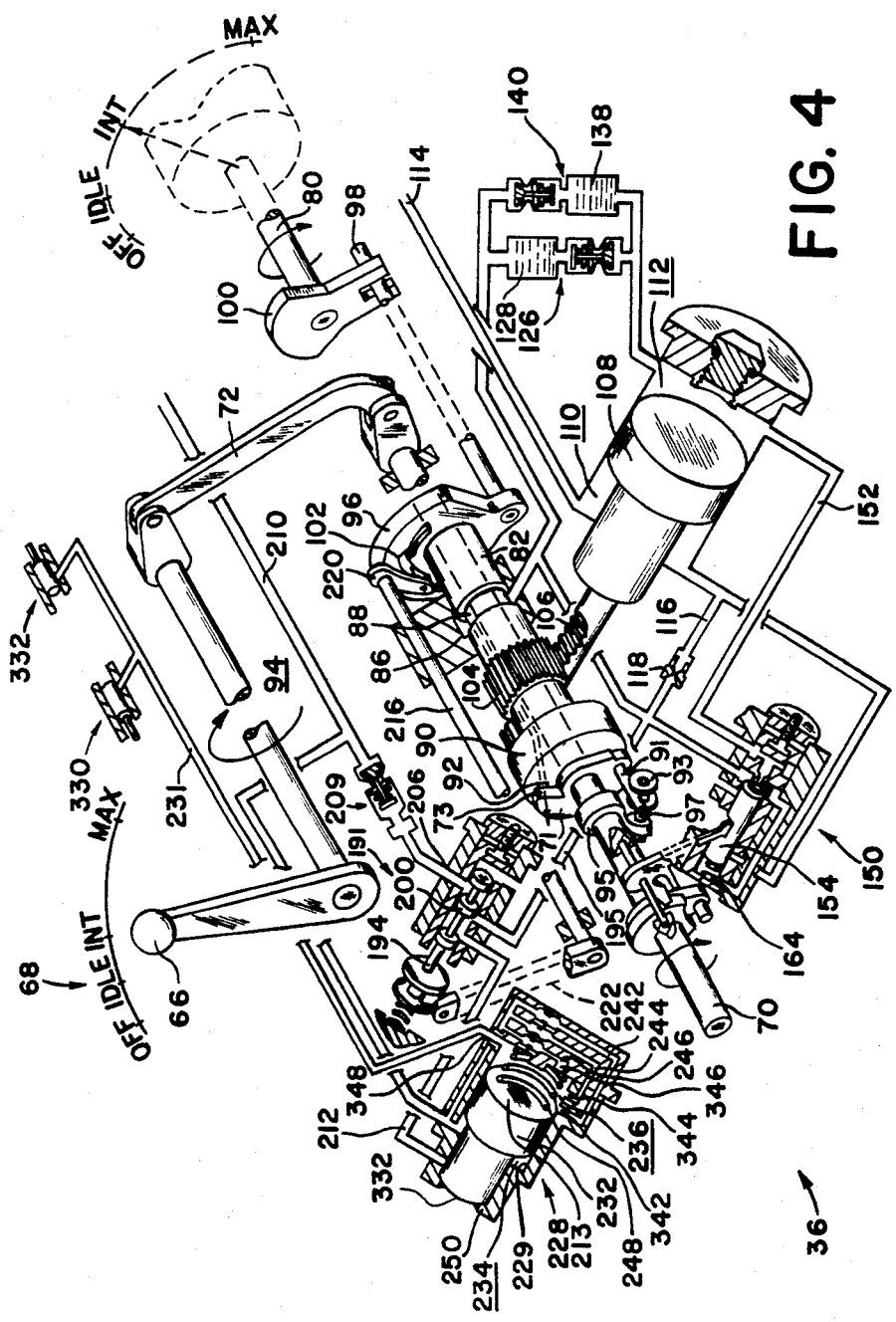
FIG. 4 is a schematic illustration with a partial sectional view of the power lever in an intermediate position.

A first end plate 90 attached to sleeve 82 is sealed to shaft 70. End plate 90 has an orifice 92 through which passage 88 is connected with the interior 94 of the valve body housing 76. A disc or plate 71 attached to shaft 70 has a face 73 that moves with respect to orifice 92 to restrict the flow of fluid from passage 88 and thereby change the fluid pressure therein in response to movement of shaft 70 by the operator. As best seen in FIG. 4, a pin 91 extends from plate 90 and is retained in a yoke 93 of an adjustment mechanism 95. The adjustment mechanism 95 has a set screw 97 that can move the yoke 93 and corresponding move face 73 with respect to orifice 92 to assure that movement of lever 66 is in alignment with yoke 100 on shaft 80.

A second end plate 96 attached to sleeve 82 is sealed to shaft 70. A link or bar 98 attached to end plate 96 is connected to shaft 80 of the fuel control mechanism 34 through yoke 100. A cam surface 102 on end plate 96 has distinct indentations thereon to define cut-off, idle, intermediate and over boost or maximum power for the operation of the turbine engine 10.

A pinion gear 104 attached to sleeve 82 receives an input from rack 106 that extends from piston 108 of the fluidic connection to provide the fuel control mechanism 34 with an input corresponding to the position of the indicator lever 66 over indicator 68.

The fluidic connection includes the piston 108 which divides a cavity into a first chamber 110 and a second chamber 112. The first chamber 110 is connected to the source of operational fluid in the fuel control mechanism 34 by conduit 114. A conduit 116 connects the first chamber 110 with groove 86 to permit communication of the operational fluid to passage 88. A restrictor 118 limits the flow of the operational fluid and effectively establishes a pressure drop between the fluid in chamber 110 and that supplied to groove 86.

A conduit 120 which connects groove 86 with the second chamber has a first branch 122 and a second branch 124.

A first restrictor assembly 126 located in the first branch 122 has a series of perforated discs 128 located adjacent a check valve 130. A plunger 132 in the check valve 130 is urged toward a seat 134 by a spring 136. Operational fluid from branch 120 flows through the perforated disc 128 past check valve seat 134 and into chamber 112. Similarly a second restriction assembly 140 in the second branch 124 has a series of perforated disc 138 that restricts the flow of fluid from chamber 112 toward conduit 120. A check valve 141 in the second restrictor assembly 140 has a plunger 142 that is urged toward seat 144 by a spring 146.

By selecting the number and size of holes in the perforated disc 128 and 138 in restrictor assemblies 126 and 140, respectively, it is possible to control the rate at which fluid enters and exits from chamber 112 during acceleration and deceleration. This modified operational fluid in chamber 112 acts on the full diameter face 113 of piston 108 while the operational fluid from conduit 114, which has a higher pressure, acts on segment 115. When the force produced by the fluid pressure in chamber 110 acting on segment 115 equals the force produced by the fluid pressure in chamber 112 acting on face 113 are equal, piston 108 remains in a stationary position.

Chamber 112 is connected to a cut-off valve 150 by a conduit 152 to provide immediate release of the fluid in chamber 112 should the indicator lever 66 be moved to the cut-off position as shown in FIG. 2.

The cut-off valve 150 has a spool 154 that separates port 156 of conduit 152 and port 158 of segment 160 of conduit 116 from port 162 connected to the interior 94 of housing 76. A passage 170 connects port 158 with port 172 to supply chamber 174 with fluid from conduit segment 160. Spring 164 and the force developed by the fluid pressure in chamber 172 acting on face 176 urges spool 154 toward seat 166 to interrupt fluid communication from conduit 152 when the indicator lever 66 is moved from the cut-off position. In addition, bore 168 has a port 178 connected to chamber 110 or conduit 114 to provide high pressure fluid to bore 168 to compensate for dimensional tolerances that may allow fluid to leak into the interior 94 and effect the seal between ports 156, 158 and 162.

A geneva-type gear 180 has a cam member 182 attached to shaft 70 and an arm 184 pivotally fixed to the housing 76 by pin 186. Arm 184 has a slot 188 on a first end and a projection 190 on the other end. A pin 192 on cam member 182 moves in slot 188 and causes arm 184 to pivot on pin 186 to import linear movement to projection 190.

Linear movement of projection 190 moves spool 154 to unseat poppet 155 from seat 166 to allow free communication from ports 156 and 158 during cut-off to allow the fluid pressure in chamber 110 to rapidly move piston 108 and sleeve 82 to the off position thereby interrupting fuel flow to the turbine 10 immediately on movement of the indicator lever 66 to the off position.

Conduit 116 is also connected to a first valve 191 by conduit segment 195. The first valve 191 has a spool 194 with a series of lands 198, 200, 202 thereon for controlling fluid flow through bore 196. Fluid in conduit 192 is presented to bore 196 through port 204 and either retained in bore 196 or communicated through ports 206 and 208 to conduit 210 and 212, respectively.

A follower has a shaft 216 held by bearings 84 and 218 in housing 76 with a first arm 220 fixed to one end and a second arm 222 fixed to the other end. A spring 226 acts on yoke 224 attached to arm 222 to urge arm 222 into contact with cam surface 102. Thus, movement of spool 194 is controlled by the cam surface 102.

A switch 228 which receives an input signal through conduit 231 from either a temperature valve 330 or a pressure valve 332 controls the fluid communication from port 208 through conduit 212. Switch 228 which is of the snap action type similar to that disclosed in U.S. Pat. No. 3,833,200 has a bore 229 with a stepped piston 232 located therein. The stepped piston 232 divides the bore into a first chamber 234 and a second chamber 236. Chamber 234 is connected by conduit 238 to conduit 210 the fuel control mechanism 34. During starting, the fluid pressure in conduit 238 is negligible while after the turbine is started, it equals the fluid pressure in conduit 114. A passage 240 connects chamber 234 with a first branch 242, a second branch 244 and a third branch 246 that are connected into bore 230 at different locations. A spring 248 acts on and urges piston 232 toward the first chamber 234. Operational fluid from passage 240 flows in the three parallel flow paths of branches 242, 244 and 246. Restrictors 241, 243 and 245 control the flow rate into chamber 236. With valves 330 and 332 closed, fluid pressure built up in chamber 236 moves piston 232 against stop 250.

MODE OF OPERATION OF THE INVENTION

Figure 7:
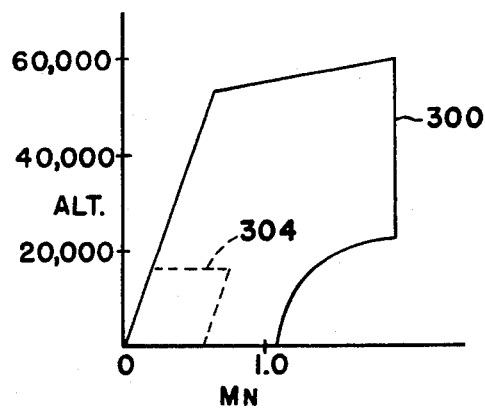
FIG. 7 is a graph illustrating the relationship between altitude, Mach Number and fuel flow envelope for a turbine engine.

FIG. 7 illustrates an operating flight envelope 300 for an aircraft showing the operational parameters of air speed (Mach No.) and altitude. Subscribed envelope 304 is a typical area wherein it is possible to operate the turbine engine 10 at a higher fuel flow than that allowed in all other areas of the flight envelope 300. The power lever arrangement 36 in conjunction with the operational fuel control 34 provides an overboost capability for the turbine engine 10 by allowing fuel flow to exceed that prescribed by envelope 304 in response to an operator input under certain operating conditions.

The power lever arrangement 36 operates in the following manner to provide the operational fuel control 34 with an input through which fuel is supplied to nozzles 30 in turbine engine 10.

In the cut-off position, shown in FIG. 2, indicator lever 66 has moved restrictor plate 71 to open orifice 92 while at the same time cam pin 192 engages arm 184 to move spool 154 and open conduits 160 and 152 to the interior 94 of housing 76. With chamber 112 opened to the interior 94, the fluid from the source acts on face 115 and moves piston 108 toward chamber 112 causing sleeve 82 to rotate and move shaft 80 of the operational fuel control 34 to the off position whereby fuel flow to nozzles 30 is immediately interrupted.

Figure 3:
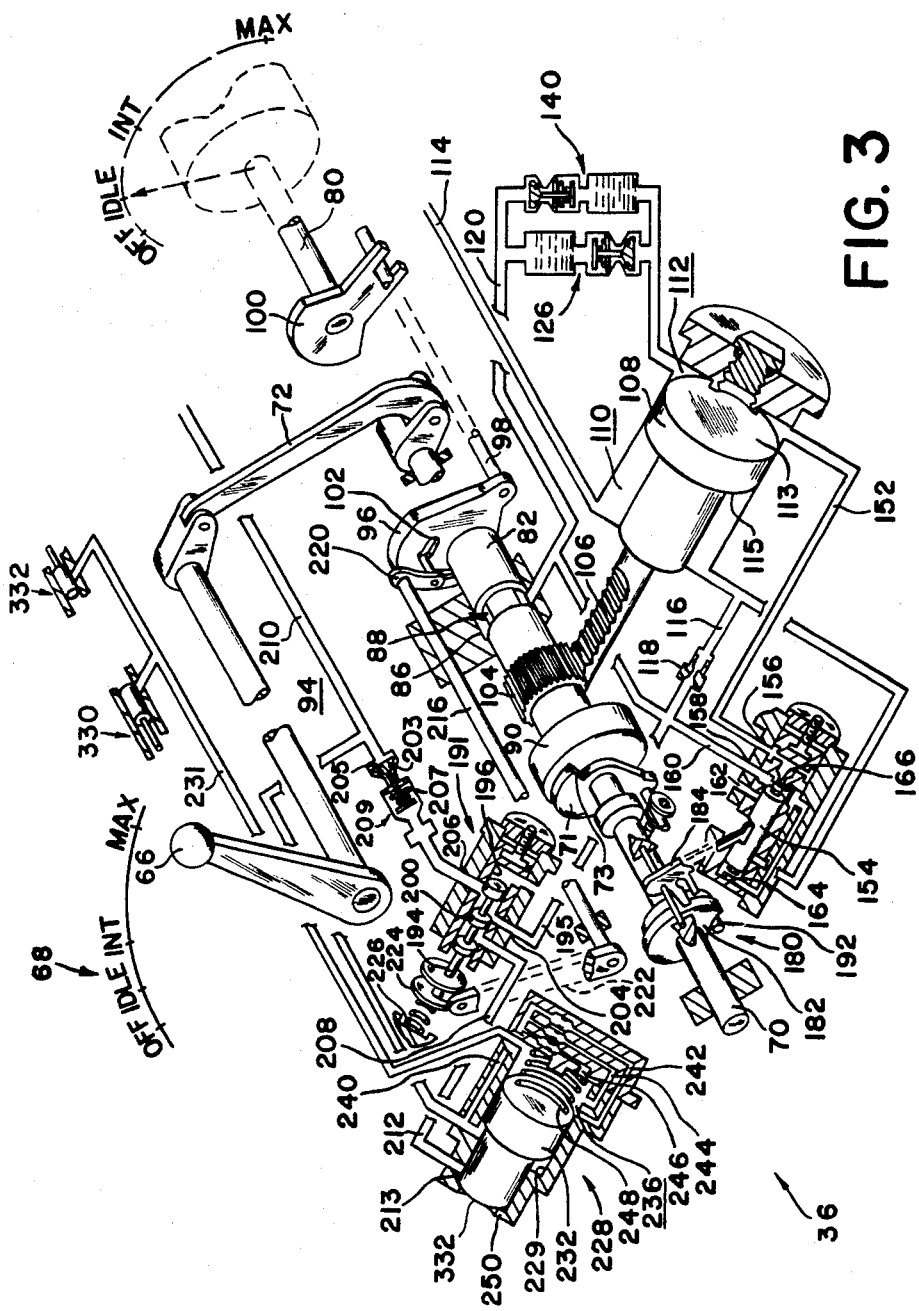
FIG. 3 is a schematic illustration with a partial sectional view of the power lever in the maximum position with the input to the control member limited to its idle fuel flow position.

When the turbine engine is started, indicator 66 is moved to at least the idle position or beyond such as shown in FIGS. 1 and 3. When indicator lever 66 is moved to such a position, link 72 rotates shaft 70 and restrictor plate 71 to close the flow path from passage 88 to the interior 94 by way of orifice 92. At the same time pin 192 on cam 182 of geneva type gear 180 moves out of engagement with arm 184 to allow spring 164 to move face 155 on spool 154 into engagement with seat 166 and terminate fluid communication through port 162 from conduit 152 by way of port 156 and bore 186.

During starting, operational fluid is communicated to the operational control 34, a portion of which is communicated through conduit 114 to chamber 110. The pressure of the fluid in chamber 110 acts on face 115 to urge piston 108 toward chamber 112. With fluid flow through orifice 92 interrupted, fluid pressure buildup occurs downstream from restrictor 118 in conduit 120. This build-up in fluid pressure is communicated through branch 126 of conduit 120 into chamber 112. The build-up or modification of fluid pressure acts on face 113 and moves piston 108 toward an idle position as shown in FIG. 3.

During starting, the fluid pressure in conduit 210 is essentially at the same pressure as chamber 94, and spool 194 in valve 191 is positioned such that the fluid pressure buildup is communicated to check valve 209 by way of conduit 195, port 204, bore 196, and port 206. As long as the fluid pressure in conduit 210 is equal to the fluid pressure in chamber 94, the fluid pressure buildup in conduit 120 is controlled by check valve 209. If the fluid pressure buildup in conduit 120 reaches a predetermined level, spring 207 is overcome and fluid flows past poppet 203 and seat 205 to limit the fluid pressure buildup in conduit 120 regardless of the position of lever 66. Thus, during starting, check valve 209 limits the pressure differential that moves piston 108 to that valve where the rack 106 rotates pinion 104 and yoke 100 of the fuel control apparatus 36 to the idle position.

Once the turbine engine starts, operational fluid pressure identical to that in conduit 114 is communicated to conduit 210 to interrupt the flow of operational fluid past check valve 209. Thereafter, the fluid pressure in conduit 120 builds up and is communicated through rate limiter or restrictor 126 to chamber 112 to act on face 113 and move piston 108 toward chamber 110. Thereafter, as piston 108 moves, rack 106 engages pinion 104 and rotates sleeve 82 and yoke 100 to provide the operational fuel control 34 with an input corresponding to the fuel flow requirement such as the maximum per position requested by the operator in moving the indicator lever 66 to the maximum position shown in FIG. 3. Sleeve 82 is rotated until the force produced by a modified fluid pressure in chamber 112 acting on face 113 is in balance with the force produced by the operational fluid pressure acting on segment 115. Thereafter, fluid flows through passage 88 past orifice 92 into the interior 94 of housing 76 before returning to the fuel control mechanism 34 by way of conduit 99 to maintain the modified fluid pressure required to hold piston 108 stationary.

During the starting operation condition, switch 228 has no effect on the development of fluid pressure in conduit 192. As shown in FIG. 4, indicator lever 66 is beyond the idle position and yet land 200 on spool 194 is positioned by lever 222 to inhibit the flow of fuel through bore 196 from port 204 to port 206. However, after starting, when spool 194 reaches an intermediate position resulting from the feedback of cam 102 acting through lever 222, conduit 195 is connected to switch 228 by conduit 212.

The fluid pressure in chamber 236 of switch 228 is directly dependent on the fluid pressure in conduit 210. As the fluid pressure in conduit 210 increases from body pressure in the interior 94 to that of the operational fluid pressure in conduit 114, the fluid pressure in chamber 236 in conjunction with spring 248 holds piston 232 against stop 250. With piston 232 aainst stop 250, surface 235 effectively seals port 213. As long as piston 232 remains stationary, the development of fluid pressure downstream from restriction 118 is controlled by the flow relationship between face 73 and orifice 92.

Figure 5:
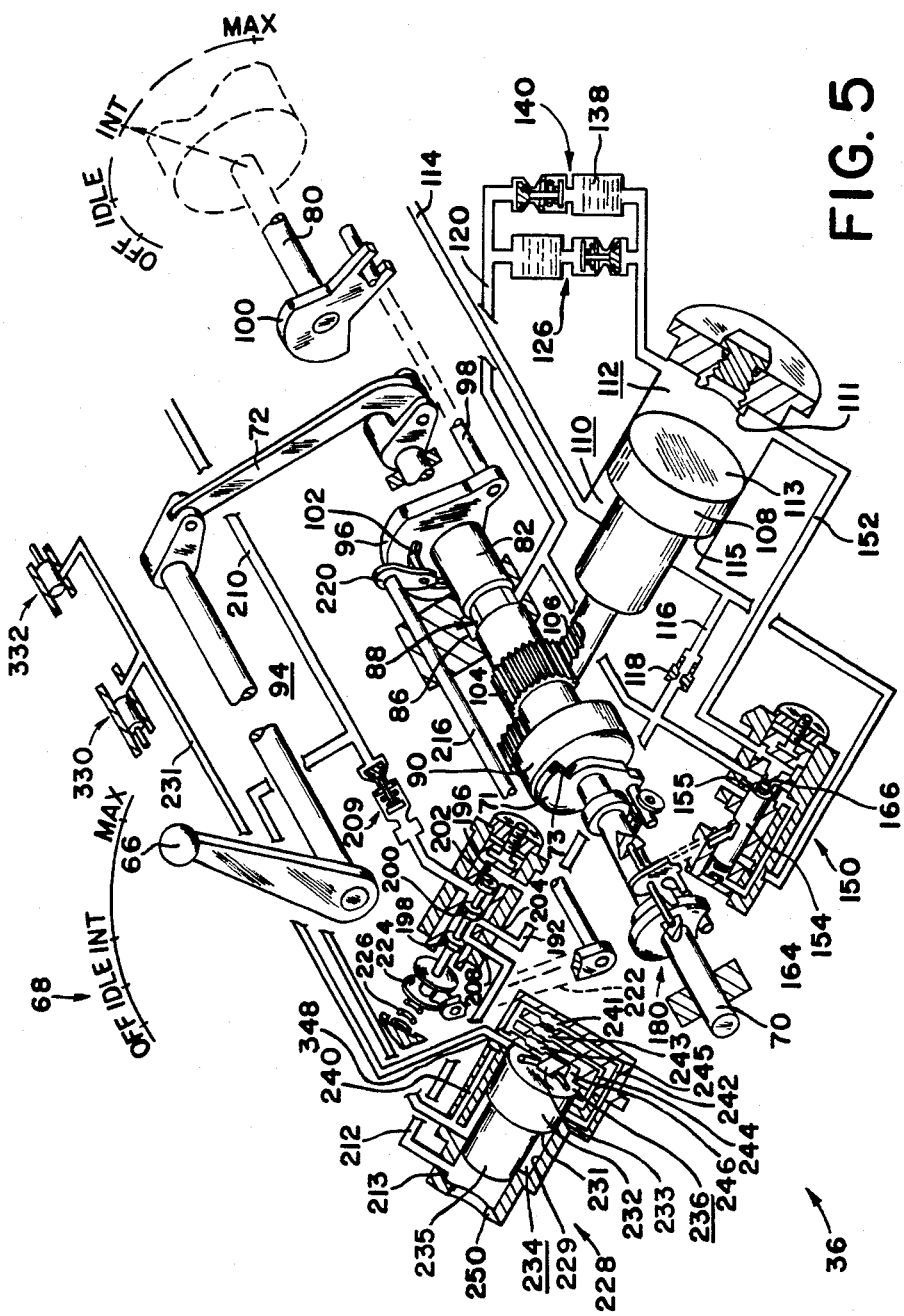
FIG. 5 is a schematic illustration with a partial sectional view of the power lever in a maximum fuel flow position.
Figure 6:
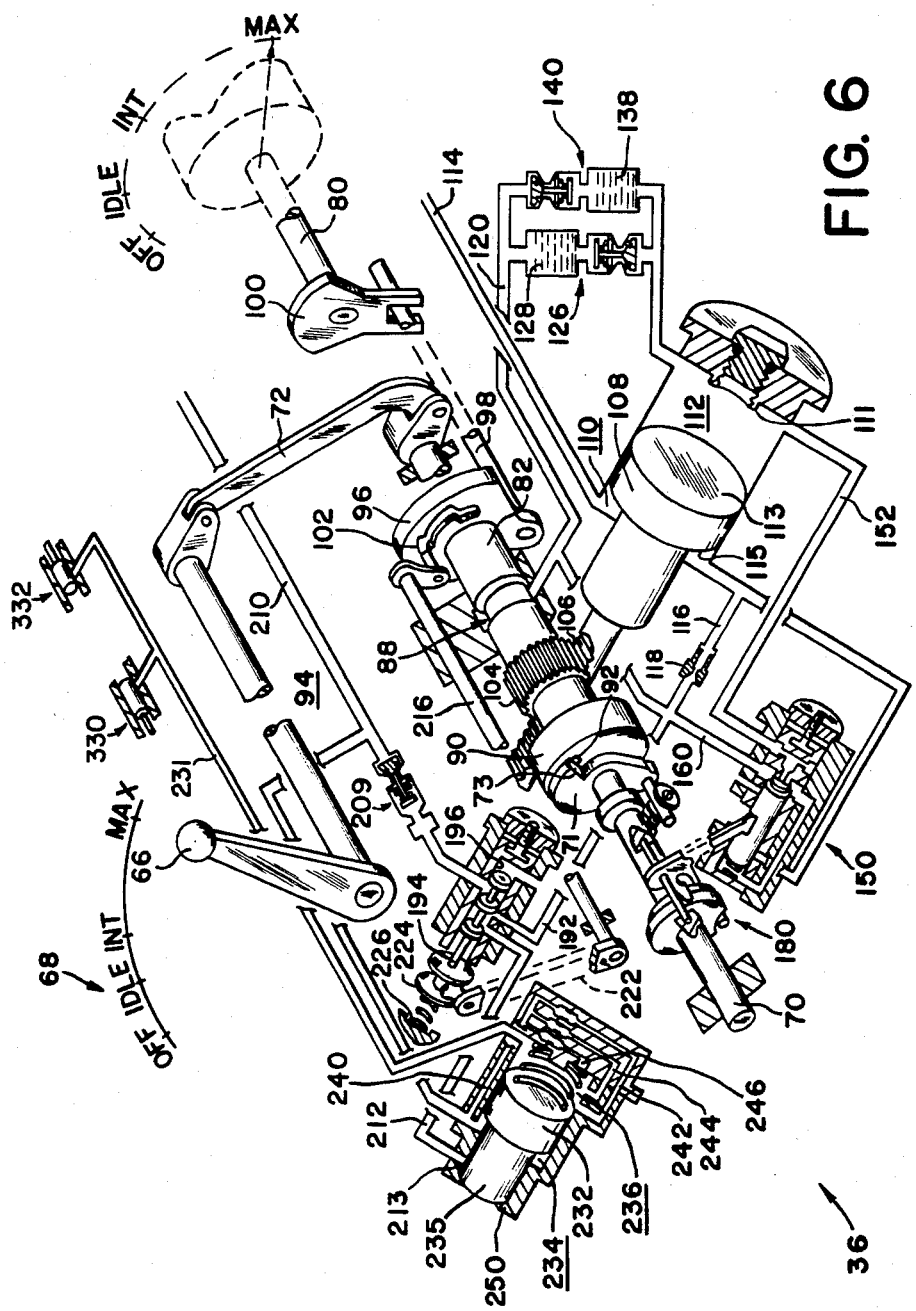
FIG. 6 is a schematic illustration with a partial sectional view of the power lever in a maximum position.

An aircraft equipped with a turbine engine 10 and the power lever arrangement 36 normally operates at an intermediate fuel flow requirement such as shown in FIG. 4. Under some circumstances an operator may desire maximum power and moves the indicator lever 66 to the position as shown in FIGS. 5 and 6. If the operational parameters of the turbine engine are outside set limits the request for additional power is inhibited as in FIG. 5. If the operational parameters for the turbine engine 10 are not exceeded, the request for additional power is provided as shown in FIG. 6.

In FIG. 5, the temperature valve 330 is shown opened indicating a sensed temperature that could damage the turbine engine 10 if maximum fuel flow was supplied to engine 10. With temperature sensor valve 330 opened, fluid in chamber 236 flows in conduit 231 to the interior 94 for return to fuel source 41 by way of fuel control mechanism 34. Since the fluid in chamber 234 is at a higher pressure than the fluid in chamber 236, the force developed by the fluid in chamber 234 acting on face 231 urges piston 232 toward stop 233. Initial movement of piston 232 past port 342 of passage 240 reduces the flow of fluid into chamber 236 through ports 344 and 346. However, fluid freely flows from chamber 236 through port 348 into conduit 231 for distribution to the interior 94 of housing 76 causing a reduction of the fluid force therein acting on face 332 of piston 232. This reduction in fluid force allows the force in chamber 236 of the fluid in chamber 234 to rapidly move piston 232 past port 344 of conduit 244 and into engagement with stop 233 to further reduce the flow of fluid into chamber 236. Fluid continues to freely flow from chamber 236 into the interior 94 by way of port 348, conduit 231 and the opened temperature valve 330 causing a still further reduction in the resistance to movement by the force of the fluid in chamber 234. In reality, once piston 232 starts to move toward stop 233, because of the parallel relationship of the flow paths for fluid through conduit branches 242, 244 and 246 and the sequential interruption of fluid flow through ports 342 and 344, snap action occurs. Fluid continues to flow into chamber 236 through port 346 but at a limited rate due to restriction 245 in branch 246.

With piston 232 against stop 233, conduit 212 is opened to the interior 94 by way of port 213 and bore 229. Even though the indicator lever 66 is moved to maximum power or fuel flow, piston 108 is restricted in its movement from the intermediate position since follower arm 222 moves in accordance with cam surface 102 and acts on yoke 224 to move spool 194 to sequentially open flow communcation between conduit 195 and conduit 212 through bore 196. Conduit 212 is progressively communicated to the interior 94 which is essentially at return pressure, and the operational fluid pressure downstream from restrictor 118 is accordingly reduced. Consequently, fluid in chamber 112 flows through flow restrictor 140. The rate of flow through restrictor 140 is controlled by the number of discs 138 and size of perforations therein. As fluid flows from chamber 112, the fluid pressure therein is reduced allowing the force produced by the fluid pressure in chamber 110 acting on segment 115 to move piston 108 toward chamber 112. As piston 108 moves, rack 106 engages pinion 104 to rotate sleeve 82 to provide link 98 with a fuel flow signal.

Arm 220 follows cam 102 to provide yoke 224 with an input such that land 200 is moved to allow the flow of operational fluid through port 204 from conduit 212 into chamber 94. At some point, the flow through port 204 creates a sufficient decrease in the modified pressure in the operational fluid in conduit 120 downstream restrictor 118 to produce a balance force condition across piston 108. Thus, even through indicator member 66 is positioned at a maximum power position, the fuel flow input to the turbine 10 is limited to the intermediate position since the response of the follower sleeve 82 is conditioned by the reaction of the fluidic connection to an operating parameter of the turbine engine 10.

While the operation of the power lever arrangement 36 has been described with the temperature sensor valve 330 as being opened or activated, the operation is identical with the pressure sensor valve 332 activated.

When the operating parameters of the turbine engine are at an acceptable level, temperature sensor valve 330 closes, as shown in FIG. 6, to terminate fluid flow from chamber 236. Fluid continues to flow from passage 240 into chamber 236 by way of the first branch 246. As the fluid pressure builds up in chamber 236, piston 232 moves toward chamber 234. When piston 232 moves past the entrance port 344 of branch 244 additional fluid is added to the fluid communicated through branch 246. Similarly, when piston 232 moves past the entrance port 342 of branch 242 additional fluid is added to chamber 236. As the fluid communication from branches 244 and 242 are added, piston 232 essentially snap to and remains in a position where port 213 remains closed. With conduit 212 closed to the interior 94, the fluid pressure developement in conduit 116 downstream restrictor 118 is again controlled by the flow relationship between disc 71 and orifice 92.

When shaft 70 is rotated by indicator lever 66 to the maximum position, disc covers orifice 92 to immediately interrupt fluid communication through passage 88. With passage 88 closed, the fluid pressure in conduit 120 downstream from restrictor 118 rapidly increases. This increase in the operational fluid pressure in conduit 120 is communicated through restrictor 126 in branch 122. The number and size of the holes in the perforated disc control the rate at which the fluid pressure increase is presented to chamber 112 for moving piston 108 toward chamber 110 to provide fuel control 34 with an input corresponding to an acceptable rate of acceleration.

In this maximum position, fluid flows through orifice 92 of passage 88 into the interior 94, where the force of the modified fluid pressure in chamber 112 acting on face 113 is balanced with the operational fluid pressure in chamber 110 acting on segment 115.

In this maximum position, even though follower member 220 engages cam surface 102 and moves spool 194 to a position where free communication is possible between conduits 195 and 212 through bore 196, surface 235 on piston 232 effectively closes port 213.

Thus, the request for maximum power from the turbine engine 10 should occur since the sleeve 82 has been rotated to full power position by the fluidic connection as shown in FIG. 6.

Thereafter, maximum fuel flow to the turbine engine 10 should continue as long as the indicator lever 66 remains stationary. During maximum power operation should either the temperature valve 330 or pressure valve 332 open, the fluid pressure in chamber 236 of operation control switch 228 is immediately reduced by flow through conduit 231 to allow piston 232 to move and open port 213 to the interior 94. Thereafter, the operational fluid pressure in conduit 120 is reduced and piston 108 is moved to an intermediate position as shown in FIG. 5. When the operator moves the indicator lever to a reduced fuel flow requirement, orifice 92 is fully opened and fluid flows from passage 88 into the interior 94. With fluid freely flowing from passage 88, the fluid pressure in conduit 116 downstream restrictor 118 causes a drop. A drop in the fluid pressure in conduit 120 which allows fluid to flow from chamber 112 through flow restrictor 140. Consequently, a pressure differential develops between the fluid in chambers 110 and 112 that moves piston 108 toward chamber 112. As piston 108 moves toward chamber 112, rack 106 engages pinion 104 to rotate sleeve 82 and reestablish fluid flow restriction through orifice 92. When the fluid pressure in conduit 120 and chamber 112 reaches a balance force condition with the fluid pressure in chamber 110, piston 108 remains stationary and the fuel flow input to the fuel control apparatus 34 should correspond to that desired by the operator as indicated by the position of the indicator lever 66.

When the operator desires to shut down the turbine engine 10, the indicator lever 66 is moved to the cut-off position, as described with respect to FIG. 2, and fluid from chamber 112 is released to the interior 94 by way of conduit 152 and conduits 160 to permit fluid in chamber 110 to rapidly move piston 108 against stop 111 in chamber 112. As piston 108 moves, rack 106 engages pinion 104 and rotates sleeve 82 to provide link 98 with an input to inactivate the fuel control apparatus 34 and immediately terminate fuel flow to the turbine engine 10.

Thus, the power lever apparatus 36 disclosed herein provides a turbine engine 10 with protection against overspeed or overheating by controlling the rate at which fuel can be provided to a turbine engine while permitting the operator to achieve the correct fuel flow during starting and in response to an operator input restricting the rate input to the operational fuel control apparatus 34.

I claim:
1. In a turbine engine having a compressor with a bleed valve device and a variable geometry apparatus connected to an operational control member for regulating the flow rate of fuel supplied through a conduit to the turbine engine as a function of atmospheric pressure and the temperature of the air supplied to the compressor to define a current operating parameter for said turbine engine, said control member being connected to a power lever apparatus which positions said control member at a desired operation of said turbine engine, the improvement wherein said power lever arrangement comprises:

a fluidic connection connected to said power lever apparatus and said control member, said power lever apparatus supplying said fluidic connection with an input signal representing a desired operating parameter, said control member supplying said fluidic connection with an operating signal representative of the current operating parameter of said turbine engine, said fluidic connection responding to said input signal and current operating signal to limit the rate of input to said control member that could cause the rate of fuel flow to said turbine engine to produce an over speed condition and/or the development of unacceptable operating temperature; and means connected to said fluidic connection and control member to override said current operating signal and allow said fluidic connection to immediately respond to said input signal by moving said control member to said desired operational position.

2. In the turbine engine as recited in claim 1 wherein said power lever apparatus further comprises: a shaft, a sleeve surrounding said shaft, first and second end members attached to said sleeve and engaging said shaft to define a passage between said sleeve and shaft, said passage being connected to receive an operational fluid from said control member, said operational fluid having an operational pressure, said first end member having an orifice through which said operational fluid is communicated;

a plate fixed to said shaft and located adjacent said first end member, a movable member connected to said sleeve, and linkage connecting said sleeve with said operational control member, said plate responding to movement of said shaft to change the flow of said operational fluid through said orifice to modify the fluid pressure thereof, said modified fluid pressure and operational fluid pressure creating a pressure differential across said movable member, said movable member responding to said pressure differential by moving said sleeve to provide an input to said control member through said linkage.

3. In the turbine engine as recited in claim 2 wherein said movable member comprises: a piston that divides a cavity into a first chamber and a second chamber, a shaft for connecting said piston with said sleeve, a first conduit having a restriction therein that connects said passage with said second chamber, said first chamber receiving said operational fluid which is thereafter communicated through said restriction in said first conduit to said passage, said modified fluid presssure being communicated to said second chamber to create a pressure differential across said piston, said pressure differential moving said piston and said sleeve until the force produced by the operational fluid pressure on said piston is balanced by the force produced by the modified operational fluid pressure.

4. In the turbine engine as recited in claim 3 wherein said second conduit further includes: a first branch that connects said passage to said second chamber and a second branch that connects said chamber to said passage, a first flow through valve located in said first branch that prevents fluid from flowing from said second chamber while allowing fluid to flow from said passage, and a second flow through valve located in said second branch that prevents fluid from flowing from said passage into said second chamber while allowing fluid to flow from said second chamber to said passage, said first flow through valve controlling the flow of fluid during acceleration, said second flow through valve controlling the flow of fluid during deceleration, said flow of fluid into said second chamber controlling the rate of movement of said piston during acceleration and deceleration to establish a desired operating parameter in said turbine engine.

5. In the turbine engine, as recited in claim 4 wherein said first flow through valve further includes: a first restrictor member and a first check valve located in said first branch, said first restrictor member modifying the flow rate of fluid from said passage to said second chamber and said first check valve only allowing fluid to flow toward said second chamber.

6. In the turbine engine, as recited in claim 5 wherein said second flow through valve further includes: a second restrictor member and a second check valve located in said second branch, said second restrictor member modifying the flow rate of fluid from said second chamber and said second check valve only allowing fluid to flow toward said passage.

7. In the turbine engine as recited in claim 6 wherein said power lever arrangement further includes: a cut-off valve connected to said shaft for communicating said second chamber with a fluid return conduit on movement of said shaft to an off position and permit the fluid pressure of the operational fluid to act on and move said piston to provide said sleeve with rotation that moves the operational control member to an off position and immediately terminate fuel flow to the turbine engine.

8. In the turbine engine, as recited in claim 7 wherein said cut-off valve includes: a cam member attached to said shaft, a spool mechanism disposed in a bore, said bore having a first port, a secon port, a third port and a fourth port, said first port being connected to said first chamber, said second port being connected to said second chamber, and said third port being connected to said first branch downstream said restriction and said fourth port being connected to said return conduit;

a resilient member for urging said spool toward a position that inhibits communication through said second, third and fourth port; and an arm pivotally attached to said housing with a first end connected to said spool and a second end, said shaft on rotation from an idle position toward an off position engaging said second end of said arm to move said spool and initiate communication between said second, third and fourth ports to permit said modified operational fluid to be communicated to said return conduit and thereafter allow said operational fluid to move said piston and rotate said sleeve to the off position.

9. In the turbine engine, as recited in claim 8 wherein said cut-off valve includes: a passage that connects said second port with a fifth port for communicating said modified operational fluid into a power chamber defined by said bore and the end of said spool, said modified operational fluid acting on said end to assist said resilient member in urging said spool toward said position that inhibits fluid communcation through said second, third and fourth ports.

10. In the turbine engine, as recited in claim 9 further including: means for providing a controlled volume of said operational fluid to said bore for distribution to said power chamber to compensate for any fluid loss that occurs in the cut-off valve as a result of changes in temperature and dimensional tolerances beween the spool and bore.

11. In the turbine engine, as recited in claim 3, wherein said power lever arrangement further includes: a first valve having a spool member therein responsive to the fluid pressure of said modified operational fluid and said current operating signal, said spool being connected to said sleeve to limit the rate of increase of fuel flow during acceleration and the rate of decrease of fuel flow during deceleration and thereby maintain the fuel flow to said turbine engine within acceptable operating parameters.

12. In the turbine engine, as recited in claim 11 wherein said spool is located in a bore, said spool having a series of lands and grooves therein, said bore having a first port connected to receive said modified operational fluid, a third port connected to receive said control signal and a second port connected to said source of operational fluid, and linkage connecting said spool with said sleeve, said linkage providing said spool with an input corresponding to rotation of said sleeve.

13. In the turbine engine, as recited in claim 12 further including: a switch responsive to an input from a sensor activated by the current parameters of said turbine engine, said switch providing said first valve with said current operating control signal.

14. In the turbine engine, as recited in claim 13 further includes: means connected to said switch for nullifying the position of said spool when the turbine engine is operating within set parameters of pressure and temperature.

15. In the turbine engine as recited in claim 13 wherein said switch includes a housing with a bore therein housing a first port connected to said operational fluid, a second port connected to said sensor, and a third port connected to said third port in said first valve, a switching piston located in said bore to define first and second chambers within said bore, said first port being connected to said first chamber and said second port being connected to said second chamber, a conduit for connecting said first chamber to said second chamber, said operational fluid being communicated to said second chamber by way of said first port, first chamber and conduit said operational fluid acting on said piston to prevent communication through said third port to said bore from said first valve.

16. In the turbine engine, as recited in claim 14 wherein said sensor responds to predetermined operational characteristics by allowing said operational fluid to be communicated from said second chamber through said second port while permitting said operational fluid to act on said switching piston and open said third port to said bore to allow said modified operational fluid to flow to said fluid return conduit.

17. In the turbine engine, as recited in claim 16 wherein said flow of the modified operational fluid through said third port limits the development of said pressure differential across said switching piston, said limited pressure differential permitting said piston to move and provide said sleeve with rotation input to provide said operational control member with a corresponding operational position independent of the operational position of said shaft.

18. In the turbine engine as recited in claim 17 wherein said input to said switch terminates allowing said operational fluid to act on and move said switching piston to close said third port and corresponding interrupt the flow of modified operational fluid from said first valve allowing further development of said operational pressure differential across said switching piston, said further developed operational pressure differential moving said switching piston to provide said sleeve with rotational input which is transferred through said linkage to move said control member to a position whereby the fuel flow to said turbine engine establishes maximum thrust during set operational conditions.

19. In the turbine engine, as recited in claim 18 wherein said sensor continually responds to current operating parameters developed during the operation of said turbine engine to determine if maximum thrust can be achieved without causing an adverse operational condition in said turbine engine.

20. In a turbine engine having a compressor with a bleed valve device and a variable geometry apparatus responsive to an operational control member for regulating the flow rate of fuel supplied through a conduit to said turbine engine as a function of atmospheric pressure and the temperature of air supplied to the compressor in response to movement of a power lever by an operator to a position corresponding to a desired operation of the turbine engine, the power lever comprising: an input member that moves in direct response to an input by the operator and a follower member linked to the operational control member, said follower member being connected to the input member by a fluidic connection responsive to an operating signal representing the operating parameters of the turbine engine to limit the rate of fuel flow during acceleration and deceleration to substantially prevent stalling and the development of unacceptable operating temperatures: and means connected to said fluidic connection for overriding said operating signal to allow unrestricted input to said control member.

21. In the turbine engine, as recited in claim 20 wherein said input member includes: an indicator lever moved by the operator to a desired operational position and linkage for attaching the indicator lever to a shaft, said shaft being rotated to and retained in a fixed position corresponding to the operational position.

22. In the turbine engine, as recited in claim 21 wherein said follower member includes: a sleeve surrounding said shaft, said sleeve and shaft having a passage therebetween, said passage being connected to a source of fluid having an operational fluid pressure, a first end plate being fixed to said sleeve and cooperating with said shaft to seal said passage, said first end plate being connected to said operational control member, a second end plate fixed to said sleeve, said second end plate having an orifice therein connected to said passage, and a plate attached to said shaft and located adjacent said orifice to restrict the flow of fluid from said passage to modify said operational fluid pressure, said operational fluid pressure and modified operational fluid pressure creating a pressure differential, said pressure differential acting on a movable wall to provide said follower with an input.

23. In the turbine engine, as recited in claim 22 wherein said movable wall includes: a piston located in a bore, said piston separating said bore into a first chamber and a second chamber, said first chamber being connected to said source of fluid and said second chamber being connected to said passage to receive said modified operational fluid pressure, said piston being connected to said sleeve, said modified operational fluid pressure and the operational fluid pressure of the source of fluid creating a pressure differential across said piston, said pressure differential acting on and moving said piston to rotate said sleeve and change the flow of fluid through said orifice until such time that said pressure differential is eliminated, said rotation of said sleeve being transferred to said control member to supply fuel to said turbine engine at a flow rate corresponding to the position of the indicator lever.

24. In the turbine engine as recited in claim 23 wherein said fluidic connection further includes: a first valve having a spool located in a bore, said bore being connected to receive said operational fluid pressure, an arm member having a first end attached to said spool and a second end that engages a cam surface on said sleeve, said arm member moving said spool on rotation of said sleeve control fluid flow through said bore.

25. In the turbine engine as recited in claim 24 wherein said fluidic connection further includes: switch means connected to sensors in said turbine and said first valve for connecting said bore of said first valve to a fuel return conduit in response to operating parameters in said turbine that could cause an unacceptable operating temperature or overspeed condition as a result of an existing fuel flow corresponding to an operator input signal.

26. In the turbine as recited in claim 24 wherein said switch means allows fluid to flow from said first valve to reduce the operational fluid pressure and thereby reduce said pressure differential across said piston to correspondingly rotate said sleeve to a position whereby said arm moves said spool to restrict the flow of fuel from said bore in said first valve and reestablish an operational fluid pressure independent of the position of said indicator lever to limit the fuel flow to said turbine engine.

27. In the turbine engine, as recited in claim 25 wherein said switch means provides an override for said first valve by inhibiting the flow of said operational fluid from said first valve to allow said operational fluid pressure to increase and move said piston to a position corresponding to the indicator lever even though said arm has moved the spool in said first valve to an open position.

28. In the turbine engine, as recited in claim 27 wherein said switch means includes: a switching piston that rapidly moves between an on and off position to assure that the operational fluid pressure is maintained within set parameters for the turbine engine.

29. In the turbine engine, as recited in claim 22 wherein said plate on said shaft includes: a radial projection that moves to cover said orifice and restrict the flow of fluid.

30. In the turbine engine, as recited in claim 29 wherein said follower member includes: an adjustment mechanism to align said radial projection with said orifice to assure that the development of the operational fluid pressure through which the sleeve is moved corresponds with the position of the indicator member.

31. In a turbine engine having a compressor with a bleed valve device and a variable geometry apparatus responsive to an operational control member for regulating the flow rate of fuel supplied through a conduit to the turbine engine as a function of atmospheric pressure and the temperature of the air supplied to the compressor to operate said turbine within set operational parameters in response to movement of a power lever arrangement to a position corresponding to a desired operation of said turbine engine, the improvement wherein: said power lever arrangement limits the rate of fuel flow to said turbine engine irrespective of a requested input applied to an indicator lever to prevent engine over speed and/or the development of an over temperature condition; and
means for monitoring said operational parameters to allow an input to the indicator lever to override the limits imposed on the input to said control member by said power lever arrangement.

32. In the turbine engine as recited in claim 31 wherein said power lever arrangement includes: a shaft connected to said indicator lever, a driver member connected to said shaft, a driven member responsive to said drive member for supplying the operational control member with an input.

33. In the turbine engine as recited in claim 32 wherein said power lever arrangement further includes: a valve connected to receive an input signal from said drive member, a follower connected to said driven member and said valve, and a switch responsive to signals representative of the current operating parameters of said turbine engine, said follower being moved by said driven member to operate said valve and allow said input signal to be communicated to said switch, said switch responding to said operational parameter by maintaining or modifying said input signal to assure that the input supplied said control member fall within acceptable limits for operating said turbine engine.

34. In the turbine engine as recited in claim 33 wherein said switch includes: a piston which responds to said signal by moving to either in an off or on position to provide said driver member with a substantially immediate input corresponding to the current operating parameters of said turbine engine.

35. In a turbine engine having an operational control member reponsive to an input from a power lever arrangement for controlling the rate of fuel flow to the turbine engine, said control member responding to inputs derived from current operating parameters of said turbine engine by modifying said rate of fuel flow and thereby establishing a desired fuel air ratio capable of producing a desired engine operation, the improvement wherein said power lever arrangement comprises:
an input member capable of being moved from an off position to an idle position, an intermediate position or a maximum position corresponding to a desired power requirement;
an output member connected to said control member; and
fluidic means responsive to said current operating parameters of said turbine and movement of said input member for providing said output member with a rotational torque which moves the control member at a controlled rate to an operational position corresponding with the position of the input member; and
means for monitoring said current operating parameters to provide said fluidic means with an override signal to allow said output member to be immediately moved to a position corresponding to said position of said input member.

36. In the turbine engine as recited in claim 35, wherein said fluidic means includes: a control piston connected to said output member which automatically limits the torque to the control member from the output member to the fuel flow associated with the idle position during starting regardless of the position of said input member, said control piston after the engine has started allowing the fuel flow to proceed to the rate selected by the position of the input member.

37. In the turbine engine as recited in claim 36, wherein said fluidic means further includes: means for limiting the communication of said current operating signal to said control piston to limit the rate at which the output member supplies an input to the control member above a predetermined rate of movement of said input member.

38. In the turbine engine as recited in claim 35, further including: means responsive to movement of said input member to the off position to allow said fluidic means to bypass the rate limiting and allow the output member to immediately move the control member to the fuel shut-off position.

39. In the turbine engine as recited in claim 37, wherein said means to override allows an operator to obtain maximum power from the turbine engine by moving said power lever to the maximum position, said means to override having a restricted operation being controlled by an input from sensors measuring temperature and pressure of said turbine to limit the fuel flow to the turbine engine regardless of the position of said input member whenever the fuel flow would exceed a set fuel flow for operating the turbine engine.

40. In the turbine engine, as recited in claim 37, further including:
a valve connected to said means to override and responsive to said override signal to allow the control piston to provide the output member with an input that exceeds the set fuel flow as long as the turbine engine temperature and/or speed does not exceed set limits.

41. In the turbine engine, as recited in claim 36, further including bypass valve means connected to said input member for allowing said control piston to provide said output member with an immediate torque that moves said control member to an off position when said input member is moved to the off position.

42. In a turbine engine having an operational control member responsive to an input signal from a power lever arrangement for controlling the rate of fuel flow to the turbine engine, said control member responding to inputs derived from operating parameters of temperature and pressure of said turbine engine by modifying said rate of fuel flow and thereby establishing a desired fuel air ratio capable of producing a desired engine power output, the improvement in said power lever arrangement comprising:
an input member movable between an off position, an idle position, an operational intermediate position, and a maximum power position;
an output member connected to said control member;
a piston located in a bore to define first and second chambers therein, said piston being connected to said output member;
said first chamber receiving an operational fluid under pressure;
conduit means for connecting said first chamber to an orifice in said output member, said input member on moving between said positions restricting the flow of fluid through said orifice to produce a modification in said operational fluid, said modified operational fluid being communicated to said second chamber to produce a pressure differential across said piston, said pressure differential acting on and moving said piston to provide said output member with an input to move said control member to a position corresponding to the position of said input member;
a sensor responsive to a set of operational conditions within the operational parameters of said turbine engine;
a switch connected to said sensor and responsive to said operational fluid;
a valve connected to said switch and receiving said modified operational fluid;
follower means connected to said output member for moving said valve to a position corresponding to the position of said control member, said valve on movement of said input member to a position past idle during starting, limits the input to the control member to the idle fuel flow and after starting to a position wherein fuel flow corresponding to the position of the input member, said follower means limits the rate of input to the control member during acceleration and deceleration to provide said control member with an input to allow additional fuel flow and obtain maximum power as long as said sensor does not provide said switch with a signal whereby the modified operational fluid presented to said valve is diverted from said conduit to thereby changing the resulting operational pressure differential.

* * * * *